United States Patent [19]

Liburdi et al.

[11] Patent Number: 5,156,321
[45] Date of Patent: Oct. 20, 1992

[54] POWDER METALLURGY REPAIR TECHNIQUE

[75] Inventors: Joseph Liburdi, Hamilton; Paul Lowden, Cambridge; Keith Ellison, Hamilton, all of Canada

[73] Assignee: Liburdi Engineering Limited, Canada

[21] Appl. No.: 572,582

[22] Filed: Aug. 27, 1990

[51] Int. Cl.$^5$ .......................... B23P 6/04; B23K 31/02
[52] U.S. Cl. ..................... 228/119; 228/175; 228/176; 228/239; 228/248; 29/889.1
[58] Field of Search ............... 228/119, 175, 176, 239, 228/248; 164/97, 108; 29/530, 402.18, 889.1; 419/8, 9, 27

[56] References Cited

U.S. PATENT DOCUMENTS

| | | |
|---|---|---|
| 3,904,382 | 7/1975 | Beltran et al. . |
| 4,073,639 | 2/1978 | Duvall et al. . |
| 4,381,944 | 5/1983 | Smith, Jr. et al. ................. 228/119 |
| 4,412,643 | 11/1983 | Sato et al. ................. 419/27 |
| 4,493,451 | 1/1985 | Clark et al. ................. 228/248 |
| 4,614,296 | 9/1986 | Lesgourgues ................. 228/119 |
| 4,686,338 | 8/1987 | Kashiwagi et al. ................. 419/27 |
| 4,734,968 | 4/1988 | Kuroishi et al. ................. 419/27 |
| 4,830,934 | 5/1989 | Ferrigno et al. . |
| 4,842,953 | 6/1989 | Perkins et al. . |
| 4,910,098 | 3/1990 | Lee et al. . |
| 4,937,042 | 6/1990 | Perkins et al. . |
| 4,940,566 | 7/1990 | Wood et al. . |

FOREIGN PATENT DOCUMENTS

| | | | |
|---|---|---|---|
| 91855 | 8/1976 | Japan ................. | 228/248 |
| 1355396 | 11/1987 | U.S.S.R. ................. | 228/119 |

Primary Examiner—Samuel M. Heinrich
Attorney, Agent, or Firm—Morgan & Finnegan

[57] ABSTRACT

To repair or join sections of a metal article, matching metal powder is sintered in the solid state to form a porous structure in the joint. A layer of matching powder, modified to incorporate melting point depressants such as boron and silicon is subsequently added to the surface of the sintered region. The joint is processed at a temperature where the modified layer melts while the sintered layer and base metal remain solid. The modified material flows into the sintered layer by capillary action and promotes liquid phase sintering, resulting in a dense joint with properties approaching those of the base metal.

20 Claims, 8 Drawing Sheets

POWDER METALLURGY REPAIR TECHNIQUE

FIELD OF THE INVENTION

This invention relates to the repair or joining of metallic materials and more specifically, to the repair of nickel, iron or cobalt-based superalloy articles.

BACKGROUND OF THE INVENTION

Components for gas turbine engines manufactured from nickel and cobalt-based superalloys often contain defects from manufacturing or service. Because these components are costly, there is considerable incentive to repair them. However, due to the lack of suitable repair procedures, many parts are currently scrapped. The use of fabricated superalloy components is similarly limited by the absence of suitable joining techniques.

Several repair techniques have been previously developed and are currently being used in specific applications. Fusion welding of superalloys is difficult due to their tendency to form weld-related cracks. Thamburaj, et al., Int. Met. Rev., Vol. 28, No. 1, pp. 1-22 (1983). However, welding is possible using lower strength filler materials. Unfortunately, this limits the use of welding to low stressed areas.

Brazing is also commonly used to join or repair superalloy components. In several processes, the defects are cleaned using fluoride ions (U.S. Pat. No. 4,098,450) or hydrogen (J. C. Bake, Welding J., Res. Supp., Aug., pp. 559-566 (1971)) to remove oxides from the crack or flaw surfaces. A braze alloy is then flowed into the gap to effect the repair or form a joint. One problem with this technique is the adequacy of the cleaning procedures. If the crack surfaces are inadequately cleaned, incomplete joints will form. The second problem is that, as with weld joints, brazed joints are typically much weaker than the base alloy. Diffusion brazing is a variation of this procedure (U.S. Pat. No. 3,678,570) in which the filler alloy has a composition similar to the base alloy and strengths approaching the base metal levels can be obtained. However, to permit reasonable joining times to be obtained, very thin joint gaps are used to obtain these strength levels. Such thin gaps are not common in repair situations.

An alternative approach for repair and joining using braze filler materials employs wide gap brazing mixtures which are mixtures of a higher melting alloy and a brazing alloy which may be of the conventional type (U.S. Pat. No. 3,155,491) or of the diffusion brazing type (U.S. Pat. Nos. 4,381,944 and 4,008,844). The higher melting alloy is typically of a composition similar to the base metal being joined, while the brazing alloy usually contains 2-4% of boron and silicon. Mixtures containing from 30-70% braze alloy have been used. An inhomogeneous structure of alloy particles in a braze alloy matrix is typically obtained. Diffusion heat treatments can be used to make the microstructure more uniform. However, the mean level of melting point depressants in the joint is still 1-3% of boron and silicon. For this type of repair, the defect is ground out prior to the use of the braze mixture, thus eliminating the problem of inadequate cleaning. However, the strength of the joint is still substantially lower than that of the base metal, limiting such repairs to low stressed areas. The use of this technique is also limited by the compatibility of the filler with the protective coatings used on turbine components. Antony & Goward, *Superalloys*, pp. 745-754 (1988). The high level of melting point depressants such as silicon and boron interfere with the performance of the coatings.

In one description of wide gap brazing, it is reported that the high melting point alloy can be sintered into the joint to form a porous structure which is infiltrated with braze alloy in a subsequent step. Chasteen & Metzger, Welding J. Res. Sup., pp. 111s-117s (Apr. 1979). This results in a distinctly nonuniform structure of powder particles in a matrix of braze alloy which has mechanical properties lower than the base metal and higher than a pure braze joint.

It has been suggested that liquid phase bonding can be used to join nickel base superalloys. M. Jeandin, et al., High Temp. Tech., Vol. 6, No. 1, pp. 3-8 (February 1988). In this process, conventional superalloy powders are placed in the joint, heated to a temperature where they are partially liquid and accelerated sintering occurs. Unfortunately, at these temperatures the base alloys being joined are also partially liquid making the technique unsuitable for repair or joining of finished shape parts.

The above references are hereby incorporated by reference.

SUMMARY OF THE INVENTION

The present invention relates to methods for joining or repairing discontinuities in metallic articles.

The present invention also relates to filler compositions to be used in such a method.

BRIEF DESCRIPTION OF THE DRAWINGS

The invention will now be described with reference to the drawings which are not considered to limit the invention.

DETAILED DESCRIPTION OF THE INVENTION

Figure 1B:
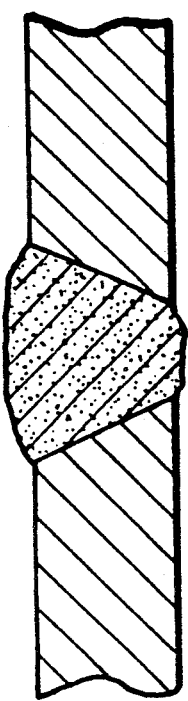
FIGS. 1(a), 1(b), 1(c), 1(d), 1(e), and 1(f) depict the progression of the repair method of the present invention.
Figure 1A:
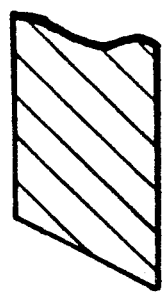
Figure 1A:
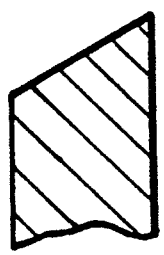
Figure 1D:
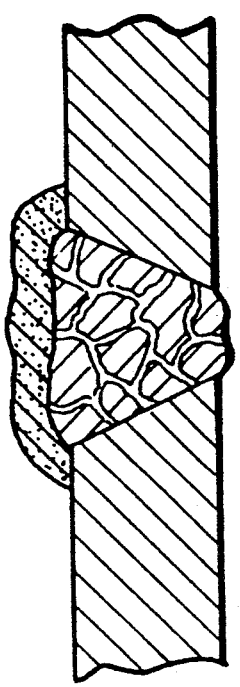
Figure 1C:
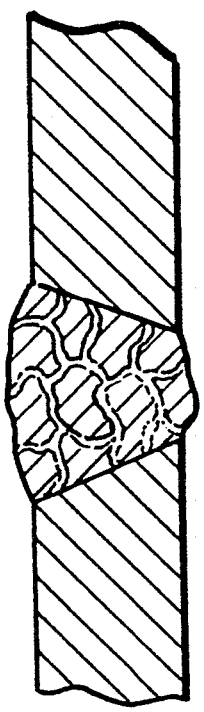
Figure 1F:
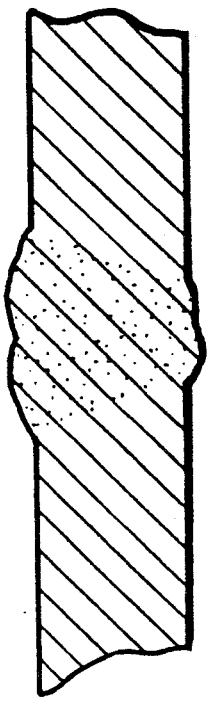
Figure 1E:
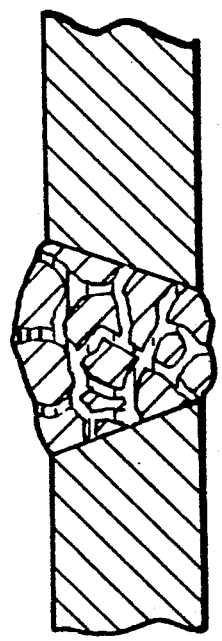

The method of the present invention involves cleaning the surface of the article to be repaired or joined in the region of the joint, as shown in FIG. 1(a). A powder with desirable mechanical properties or environmental resistance is applied to the joint in the sufficient quantity to fill the void, as shown in FIG. 1(b). The whole component or fabrication is heated in a vacuum, an inert atmosphere or a reducing atmosphere to a temperature where solid state sintering of the powder can take place. The component or fabrication is held at that temperature for sufficient time to effect partial densification of the powder. Upon cooling, a porous metallic structure is obtained in the joint or repair area, as shown in FIG. 1(c). A layer of braze alloy with a composition similar to the base alloy or powder is applied to the surface of the porous region, as shown in FIG. 1(d). The braze alloy or powder composition is modified from the base alloy composition by the addition of melting point depressants which lower the solidus to a temperature below the sintering temperature previously used. The component or fabrication is heated in a vacuum to a temperature which causes the braze alloy to melt. While at temperature, the braze alloy is drawn into the porous region and partially fills the interstices in the porous region (FIG. 1(e)). The presence of the liquid phase promotes sintering, resulting in the relatively complete densification of the powder in the joint region. After sufficient time to effect full densification, the component or fabrication is cooled. The result of the process is a joint which is 99+% dense (FIG. 1(f)). The joint also contains a minimum of melting point depressants, because only enough braze alloy to promote liquid phase sintering need be used. For this reason, properties approaching those of the base metal can be obtained and compatibility with coating systems is not problematic.

In the preferred embodiment of the invention, the base metal of the articles being repaired or joined is one of the family of iron, nickel, or cobalt based superalloys. If the region to be repaired contains defects, those defects are removed by grinding or cutting the damaged area.

The surface to which the powder metal filler is to be applied are cleaned using abrasive or chemical means to expose bright unoxidized metal. Alternatively, the process can be carried out in a gaseous atmosphere which is capable of removing oxide layers. Hydrogen containing reducing atmospheres or vacuum are suitable for aluminum-free alloys while fluorine bearing atmospheres may be used for alloys containing aluminum.

The joint or void is filled with powder metal which has desirable mechanical and/or environmental resistance characteristics. In particular, the composition may be selected to have high tensile strength, creep strength, hardness, oxidation resistance, corrosion resistance or wear resistance. In some instances, powder of the same composition as the base metal may therefore be used. The powder size may be any available grade. It is preferred to use a mixture of coarse and fine particle sizes, because this results in greater initial packing density, promotes sintering, and reduces the amount of braze alloy necessary for liquid phase sintering. To assist in keeping the powder in place during handling, a binder compound which will evaporate at high temperatures may be used. Mechanical dams may also be used to prevent the powder from flowing out of the joint or void. Some overfilling of the joint is necessary to accommodate shrinkage during sintering.

The fabrication or component being repaired is placed in a furnace under an inert atmosphere, reducing atmosphere or vacuum and is heated to a temperature suitable to promote solid state sintering of the powder, typically in the range of 1000°–1400° C. The temperature must be chosen to prevent detrimental effects in the base alloy. It must be below the solidus of the base alloy to prevent incipient melting and at a low enough temperature that no solid state degradation such as grain growth or irreversible phase transformations occur. The part is held at temperature for sufficient time for partial solid state sintering to occur. Solid state sintering is the process by which particles in a powder mass or compact are consolidated by solid state and surface diffusion, wherein the powder remains solid. Partial solid state sintering results in a porous structure which is less than 100% dense. Times of 20 minutes to 24 hours are adequate depending on the temperature chosen. The parts are then cooled to ambient temperature.

A thin layer of low melting braze alloy is then added to the surface of the partially sintered region. Typically, a layer of 0.5–3 mm is added. The powder composition is selected on the same basis as the powder initially used, as described above. Additions of melting point depressants such as boron and silicon are made to lower the solidus below the sintering temperature. The minimum amounts of melting point depressants necessary to achieve this are used, typically, amounts of 0.1 to 2% Boron and 0.1 to 2% Silicon are used. The alloy may be added as a powder or in the form of a tape or foil.

After the application of the braze alloy, the component or fabrication is placed in a furnace under vacuum or in an inert or reducing atmosphere and heated to a temperature similar to that used for the partial sintering cycle, typically in the range of 800°–1600° C., preferably 1,000°–1,400° C. The temperature is selected to be such that the low melting braze will be liquid, and wet the surfaces of the pores in the previously sintered area. The component is held at temperature for a sufficient interval to promote liquid phase sintering, typically, 20 minutes to 24 hours. Liquid phase sintering is the process by which adjacent particles in a powder mass are consolidated principally by diffusion through a liquid phase present between the particles. The component or fabrication is then cooled to room temperature. The component is then given a suitable heat treatment to develop mechanical properties in the joint and the base metal. Hot isostatic pressing can be used as part of the heat treatment to close any minor internal porosity. Hot isostatic pressing is the process of simultaneously exposing the component to high pressures (10–50 KSI) and temperatures greater than 1000° C.

The result of the process is a component or fabrication with joints or repaired areas having mechanical properties similar to those of the base metal and containing a minimum of melting point depressant additions.

It is equally possible to form joints or repair areas by applying both the powdered metal and the low melting braze alloy simultaneously, either in alternate layers or as a mixture. The component is then processed by partial sintering at a temperature wherein all of the constituent alloys remain solid. The partially sintered area is then further heated to a temperature wherein the low melting braze is liquid and liquid phase sintering can take place.

Figure 2A:
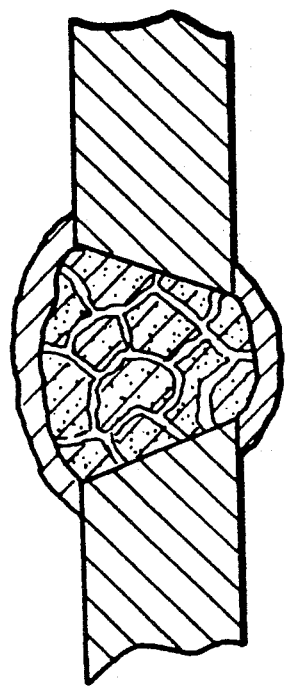
FIGS. 2(a), 2(b), 2(c), 2(d), and 2(e) depict the progression of an alternative embodiment of the invention.
Figure 2B:
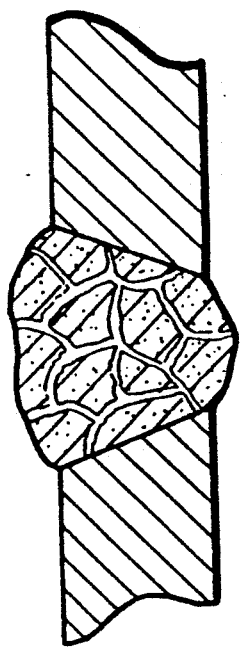

In another embodiment of the invention, a partially sintered layer of powder metal is prepared by the method described above, as shown in FIG. 2a. A layer of low melting braze alloy is then applied over the surface of the partially sintered area (FIG. 2b) and the component is heated to a temperature at which melting of the braze takes place, but no significant infiltration occurs. This temperature is lower than that required for full infiltration and is typically between 800° and 1200° C. This results in the formation of a skin over the sintered layer which effectively encapsulates the partially sintered region upon cooling (FIG. 2c).

Figure 2D:
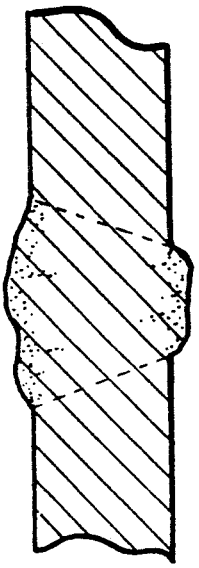
Figure 2C:
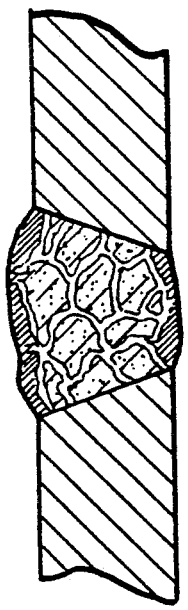
Figure 2E:
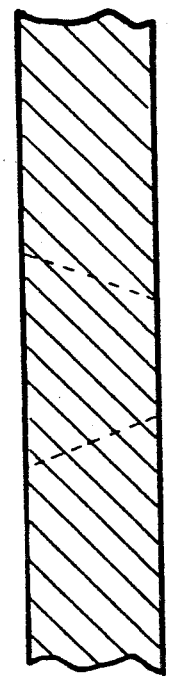

Finally, the component is subjected to a hot isostatic pressing cycle in which high gas pressures (10–50 psi) and temperature below the remelting temperature of the braze (800°–1200° C.) are employed to result in densification of the partially sintered region (FIG. 2d). The outer skin which contains material of the braze composition can then be removed (FIG. 2e). This results in a joint containing substantially no material of the braze composition.

Figure 3A:
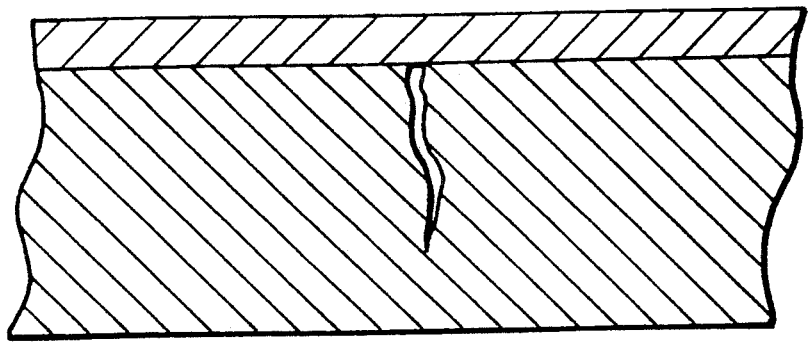
FIGS. 3(a) and 3(b) show an alternative embodiment of the invention involving forming a layer over a defect.
Figure 3B:
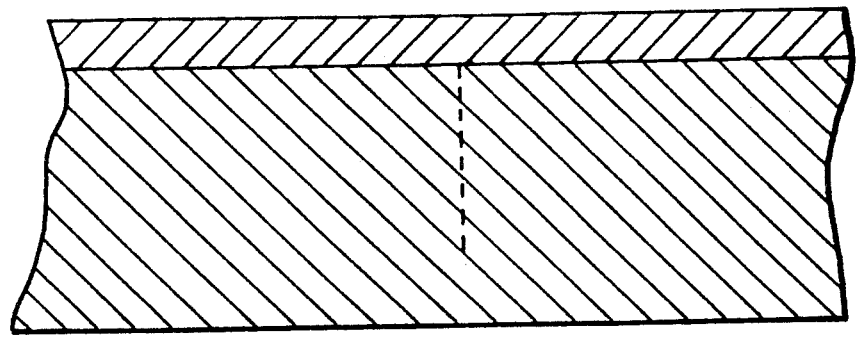

Similarly, defects in an article may be repaired. The surfaces of the defect are cleaned by exposure to a suitable atmosphere which can remove surface oxides, for example, hydrogen or fluorine. A layer is formed over the defect, as shown in FIG. 3(a) using the two-step process of solid state sintering and liquid phase sintering described above. This layer effectively encapsulates the defect and seals it from the outer surface. The component is then given a hot isostatic pressing treatment. The pressure differential between the surface of the components and the defect surfaces causes the defect to collapse and results in diffusion bonding of the surfaces. The defect is thus eliminated from the component, as shown in FIG. 3(b).

EXAMPLES

The invention will now be described with reference to certain examples that are not considered to limit the invention.

EXAMPLE 1(a)

Figure 4:
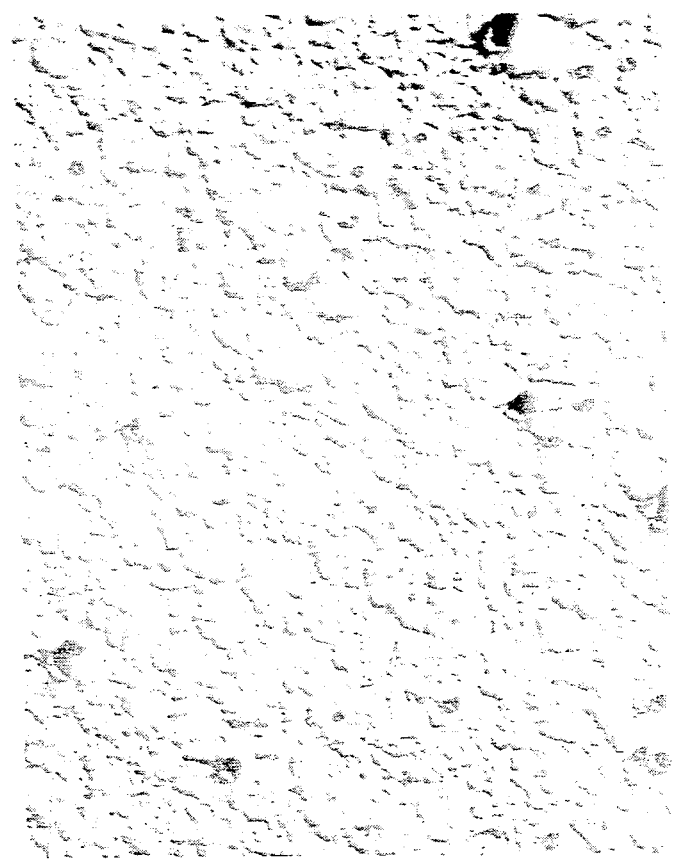
FIG. 4 is a photomicrograph of the joint formed in Example 1(a)
Figure 5:
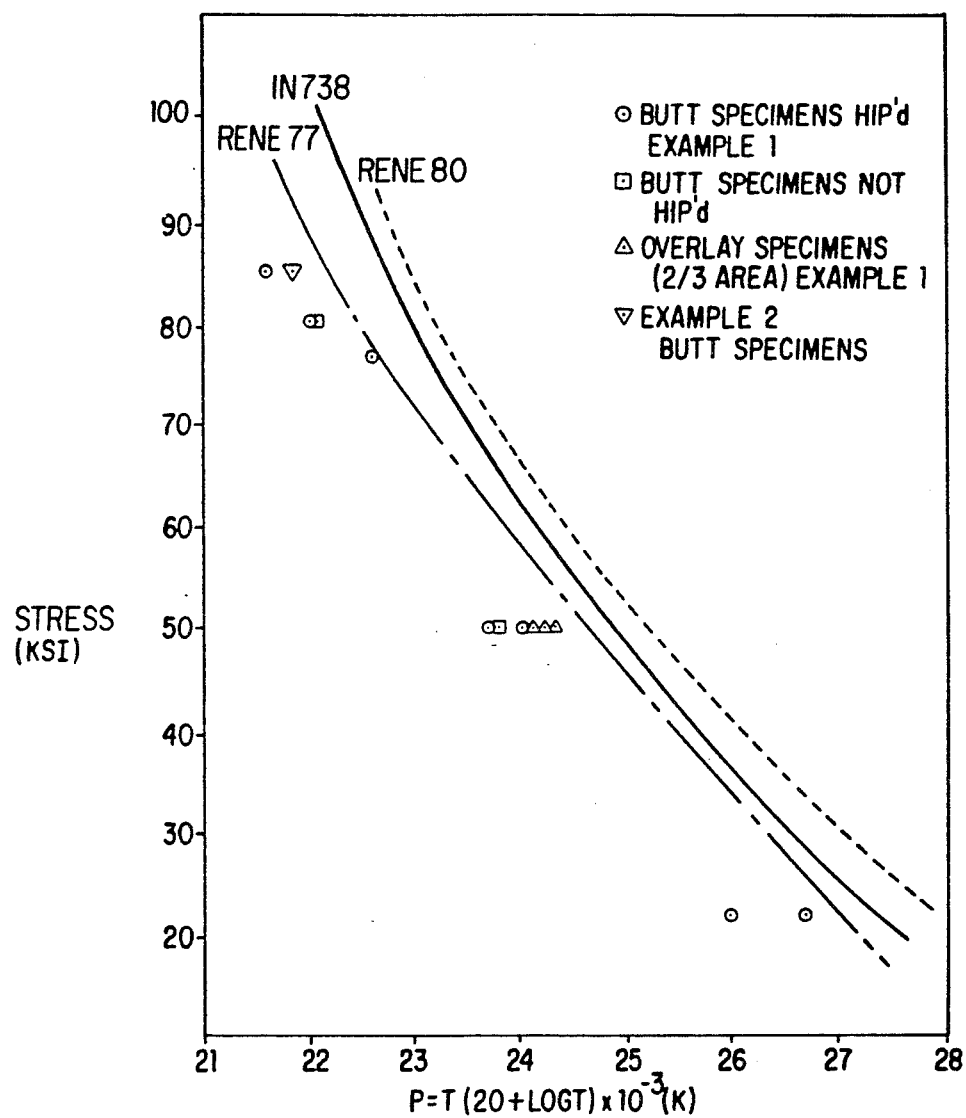
FIG. 5 shows the stress rupture properties of the joint formed in Examples 1 and 2.

Joints are between plates of IN738, a nickel base alloy with a nominal composition of 16% Cr, 8.5 Co, 1.75% Mo, 2.6% W, 0.9% Nb, 3.4% Ti, 3.4% Al, 0.01% B, 1.75% Ta, Ni bal and Si as low as possible. A powder mixture of −140 mesh and −325 mesh particle sizes with a matching composition is partially sintered in the joint by exposing it for 4 hours at 1200° C. in vacuum. A layer of braze alloy with a nominal composition the same as the base alloy but with the addition of 1% B and 1% silicon is applied over the joint area. The joint is heated at 1200° C. for 4 hours in vacuum and is subsequently aged at 1120° C. for 2 hours and 845° C. for 24 hours. The processing resulted in the formation of a sound dense joint, as shown in FIG. 4. Samples removed from the joint and tested by stress rupture testing show the joint to have creep strength approaching those of the base alloy, as shown in FIG. 5.

EXAMPLE 1(b)

A layer of IN738 powder is deposited on the surface of an AISI 304 stainless steel sheet using the method of example 1(a). The thickness of the sheet is increased 0.025 inches by the continuous layer formed on the surface. This layer increases the oxidation resistance of a material.

EXAMPLE 2

In a second instance, a joint is prepared between plates of IN738 alloy using a −325 mesh powder of Rene 80 powder with a nominal composition of 14% Cr, 9.5% Co, 4% Mo, 4% W, 5% Ti, 3% Al, 0.015 B and Ni balance. The joint is partially sintered at 1200° C. in vacuum for 2 hours. A layer of braze alloy of the same composition used in the first example is placed over the joint. The joint is heated to 1200° C. for two hours in vacuum and aged at 1120° C. for two hours and 845° C. for 24 hours. The resulting joint is sound and dense. The stress rupture properties are similar to those of the base metal, as shown in FIG. 5.

EXAMPLE 3

Repairs of damaged turbine blades and vanes are made using the technique outlined in Example 2. In one instance, ¾ inch cracks in a Rene 80 alloy turbine vane segment are repaired by removing the damaged area and filling it with matching alloy powder of −325 mesh. In a second instance, a Rene 80 alloy turbine blade which had worn by rubbing at its tip has a powder buildup applied to increase its height by 0.100 inches. Both parts are processed, as in Example 2.

EXAMPLE 4

For a comparison, a powder buildup is prepared on an AISI 304 stainless steel substrate using the technique of Chasteen & Metzger, supra. A layer of Rene 80 powder is sintered at 1130° C. for 30 minutes. A layer of braze of composition 7% Cr, 3% Fe, 6% W, 4.5% Si, 3% B and balance nickel is deposited over the sintered layer and processed at 1130° C. for 30 minutes. The result is distinctly a two component structure consisting of alloy particles in a braze alloy matrix. This is in contrast with the result of the present invention which yields a uniform microstructure.

EXAMPLE 5

Joints are prepared from IN738 alloy in an identical fashion to that described in Example 1. Subsequent to the processing of Example 1, the parts are processed through a hot isostatic pressing cycle at 1200° C. and 15,000 psi argon gas pressure for 2 hours. This processing eliminated all residual porosity. Stress rupture bars are machined and tested from these joints. As shown in FIG. 5, the properties approach those of the base metal.

EXAMPLE 6

A welded IN738 alloy turbine blade containing welding cracks is processed to eliminate the cracks. The cracked areas are not removed prior to processing. A layer of matching alloy powder is applied over the cracked area and sintered at 1200° C. for 4 hours in vacuum. A layer of braze alloy of the same composition used in Example 1 is then applied, and the blades are processed at 1200° C. for 4 hours in vacuum and hot isostatic pressed at 1200° C. for 2 hours at 15,000 psi argon pressure. The surface deposit is removed after processing. Metallographic examination revealed that the cracks are entirely eliminated.

EXAMPLE 7

An IN738 alloy turbine blade tip, as in Example 3, is repaired by an alternative process in which a layer of IN738 powder is first deposited to a thickness of 0.100 inches. A second brazing alloy having a composition the same as the IN738 alloy but with the addition of 1% B and 1% Si is applied on top of the first layer. The blade is heated at 1050° C. for 4 hours under vacuum causing partial sintering of both powders. The blade is subsequently heated in the same furnace cycle to 1200° C. for 4 hours where melting of the braze alloy occurs resulting in complete liquid phase sintering of the IN738 powder. The blade is subsequently aged at 1120° C. for 2 hours and 845° C. for 24 hours. After this heat treatment, the blade tip is restored to its original shape by grinding. Sintering and brazing may thus be completed during one thermal cycle when the sintering temperature is below the solidus temperature of the brazing alloy.

EXAMPLE 8

An IN738 alloy turbine blade is repaired, as described in Example 7, however, a homogeneous mixture of the IN738 and braze alloy powders is placed over the damaged area. The powder mixture consists of 30% braze and 70% IN738. Using the same thermal cycle as described in Example 7, the powders sinter partially at 1050° C. by solid state, diffusion, followed by complete liquid phase sintering at 1200° C. The original blade dimensions are restored by grinding to remove excess material following heat treatment.

EXAMPLE 9

A crack in an IN792 turbine wheel is removed by grinding leaving a notch approximately ¼ inch in depth and ⅛ inch wide. This notch is filled with IN738 alloy powder, such that there is an excess of this material around the joint. The IN738 powder is sintered at 1050° C. for 4 hours under vacuum. A second layer of a commercial brazing alloy (100) having a nominal wt % of 19 Cr, 10 Si—balance Ni is applied over the first sintered layer. The part is then heated to 1100° C. under vacuum for 30 minutes causing partial melting of the brazing alloy, sealing of the surface and limited infiltration of brazing alloy into the surface of the sintered powder. The first sintered layer retains its porous structure until it is further processed by hot isostatic pressing (HIP) at 1050° C. and 50,000 psi argon gas pressure for 4 hours. During this cycle, the IN738 powder is completely consolidated. The braze alloy does not melt during the final cycle and acts as an encapsulating layer for the IN738 powder during the HIP cycle. Excess braze and IN738 alloy are removed from the part by a grinding procedure.

EXAMPLE 10

A modification is made to an IN738 turbine blade to substantially improve the corrosion resistance of the blade tip. The blade height is first reduced 0.050 inches by grinding. A commercial alloy (995) containing 32 Ni, 21 Co, 8% Al, 0.5 Y and a balance of cobalt (commonly referred to as an M Cr Al Y alloy) is deposited to a thickness of 0.050 inches on the tip area of the blade. This layer is first heat treated at 1200° C. for 4 hours at a pressure of $10^{-5}$ Torr, causing partial sintering of the powder. A second commercial powder (100) having 19% Cr, 10 Si with a balance of nickel is deposited on top of the first layer. This structure is heat treated at a temperature 1155° C. for 30 minutes and a pressure of $10^{-5}$ Torr causing liquid phase sintering and complete consolidation of the first layer. The blade tip is subsequently restored to its original dimensions. The additional concentrations of Cr, Al, Si and Y in the tip deposit result in reduced rates of environmental attack as compared to the base alloy material, under similar service conditions.

EXAMPLE 1

The wear mechanism which occurs between the tip of a rotating IN738 turbine blade and an abradable seal material is favorably altered by introducing hard ceramic particles in a metal matrix to the tip of the blade. A mixture of ceramic particles, ranging in size from 0.001 to 0.020 inches and a nickel or cobalt base alloy powder is deposited on the tip of a turbine blade. The ceramic particles are composed of aluminum oxide. The metal alloy powder may be the same as the blade alloy or an M Cr Al Y alloy. The deposit is heat treated at 1100° C. for 4 hours at a pressure of $10^{-5}$ Torr causing partial sintering of the metal powder which contains the ceramic particles. A second commercial powder (100) having a composition 19% Cr, 10% Si and a balance of nickel is deposited over the first layer. The articles is then heat treated at 1155° C. for 30 minutes at $10^{-5}$ Torr causing liquid phase sintering and complete consolidation of the first layer. The blade tip is then machined to the required dimensions, exposing the ceramic particles in the metal deposit. Wear between the blade tip and the shroud material now occurs by a cutting mechanism rather than an adhesive process which leaves a smooth seal surface. Under these conditions, wear of the blade tip is decreased and operational efficiency of the gas turbine is improved.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:

1. A method for liquid phase sintering comprising, partially solid state sintering a metallic powder onto a metallic or alloy substrate at a temperature where the metallic powder and the substrate remain solid, applying a layer of alloy having a melting point lower than that of the metallic powder and the metallic or alloy substrate to a surface of the sintered metallic powder and liquid phase sintering the sintered metallic powder with the lower melting alloy at a temperature at which the metallic or alloy substrate is solid, wherein the metallic powder, the metallic or alloy substrate, and the lower melting alloy have similar nominal compositions, with the lower melting alloy containing amounts of additional elements to reduce its melting point.

2. The method according to claim 1, wherein the metallic powder, the metallic or alloy substrate, and the low melting alloy are selected from iron, nickel, or cobalt based superalloys.

3. The method of claim 2, wherein the superalloy comprises 8–35 wt % Cr, 0–15 wt % W, 0–15% Mo, 0–10% Ta, 0–6% Nb, 0–6% Al, 0–6% Ti, 0–5% Hf, 0–1% Y, 50–80% Ni, and/or Co, and/or Fe.

4. The method according to claim 3 wherein the partial sintering step is performed in the temperature range 800°–1600° C.

5. The method according to claim 3 wherein the partial sintering is performed in the temperature range 1000° to 1400° C. in a protective atmosphere.

6. The method of claim 3 wherein the liquid phase sintering is performed in the temperature range 800°–1600° C.

7. The method according to claim 3 wherein the liquid phase sintering is performed in the temperature range 1000° to 1400° C. in a protective atmosphere.

8. The method according to claim 3, wherein the additional elements are 0.1–2% Silicon, 0.1–2% Boron, or both.

9. A method for repairing or joining of metallic or alloy articles comprising, mechanically cleaning the repair or joint area to remove oxides and defects, applying a metallic powder to fill the repair or joint area, heating the repair of joint to effect partial solid state sintering of the metallic powder, applying a layer of alloy having a melting point lower than the metallic powder and the articles being repaired or jointed, heating the repair or joint to effect melting of the low melting alloy, and liquid phase sintering of the metallic powder at a temperature at which the articles being repaired or joined and the metallic powder remains solid, wherein the metallic powder, the metallic or alloy article to be joined or repaired, and the lower melting alloy have similar nominal compositions, with the lower melting alloy containing amounts of additional elements to reduce its melting point.

10. A method for liquid phase sintering comprising, first applying to a metallic or alloy substrate a mixture of a metallic powder having a melting point equal or greater than the metallic or alloy substrate and a low melting alloy powder having a melting point lower than the metallic or alloy substrate, second partially solid state sintering the powder mixture at a temperature above the melting point of the low melting alloy and liquid phase sintering the partially sintered powder mixture at a temperature above the melting point of the low melting alloy, wherein the metallic powder, the metallic or alloy substrate, and the lower melting alloy have similar nominal compositions, with the lower melting alloy containing amounts of additional elements to reduce its melting point.

11. A method of repairing or joining or adding material to metallic or alloy articles comprising; the application of a metallic powder to fill the joint or repair area, heating the joint or repair area to effect partial solid state sintering of the metallic powder, application of a layer of an alloy having a lower melting point than the metallic powder and the metallic or alloy articles, heating the joint or repair area to a temperature at which melting of the braze alloy occurs, but at which minimal flow occurs resulting in liquid phase sintering of a skin over the partially sintered region, hot isostatic pressing of the article to effect densification of the partially sintered area.

12. A method of preparing a wear resistant layer on alloy articles comprising applying a mixture of metallic powder and hard particles, heating the article to effect partial solid state sintering of the metallic powder, applying a layer of alloy having a melting point lower than the metallic powder and the alloy article, heating the article to effect melting of the low melting alloy and liquid phase sintering of the metallic powder at a temperature at which the article and the metallic powder remain solid.

13. The method according to claim 12 in which the hard particles are particles of metal nitrides, oxides, carbides, borides, or mixtures thereof.

14. A method for liquid phase sintering comprising, partially solid state sintering a metallic powder onto a metallic or alloy substrate at a temperature where the metallic powder and the substrate remain solid, applying a layer of alloy having a melting point lower than that of the metallic powder and the metallic or alloy substrate to a surface of the sintered metallic powder and liquid phase sintering the sintered metallic powder with the lower melting alloy at a temperature at which the metallic or alloy substrate is solid, wherein the low melting alloy is of the same nominal composition as the metallic or alloy substrate with the addition of 0.1-2% Silicon, 0.1-2% Boron, or both.

15. The method according to claim 14, wherein a mixture of coarse and fine metallic powder particle sizes is used.

16. The method according to claim 14, wherein the articles are gas turbine components.

17. A method for liquid phase sintering comprising, partially solid state sintering a metallic powder onto a metallic or alloy substrate at a temperature where the metallic powder and the substrate remain solid, applying a layer of alloy having a melting point lower than that of the metallic powder and the metallic or alloy substrate to a surface of the sintered metallic powder and liquid phase sintering the sintered metallic powder with the lower melting alloy at a temperature at which the metallic or alloy substrate is solid, wherein the component is subsequently hot isostatically pressed.

18. The method of claim 17, wherein the sintered layer is formed to seal a defect in the substrate which is closed by subsequent hot isostatic pressing.

19. A method for liquid phase sintering comprising, partially solid state sintering a metallic powder onto a metallic or alloy substrate at a temperature where the metallic powder and the substrate remain solid, applying a layer of alloy having a melting point lower than that of the metallic powder and the metallic or alloy substrate to a surface of the sintered metallic powder and liquid phase sintering the sintered metallic powder with the lower melting alloy at a temperature at which the metallic or alloy substrate is solid, wherein the layers of the metallic powder and low melting alloy are applied prior to processing and the partial sintering and liquid phase sintering steps are subsequently performed in a single thermal cycle.

20. A method for liquid phase sintering comprising, partially solid state sintering a metallic powder onto a metallic or alloy substrate at a temperature where the metallic powder and the substrate remain solid, applying a layer of alloy having a melting point lower than that of the metallic powder and the metallic or alloy substrate to a surface of the sintered metallic powder and liquid phase sintering the sintered metallic powder with the lower melting alloy at a temperature at which the metallic or alloy substrate is solid, wherein the metallic powder contains 17-31% Cr, 6-11% Al, 0.5-1% Y and a balance of nickel, cobalt, or iron.

* * * * *

UNITED STATES PATENT AND TRADEMARK OFFICE
CERTIFICATE OF CORRECTION

PATENT NO. : 5,156,321  
DATED : October 20, 1992  
INVENTOR(S) : Joseph Liburdi et al.

Page 1 of 1

It is certified that error appears in the above-identified patent and that said Letters Patent is hereby corrected as shown below:

Column 9, claim 10,  
Line 10, replace the term "above" to the term -- below --.

Signed and Sealed this

Fifth Day of February, 2002

Attest:

JAMES E. ROGAN  
Attesting Officer    Director of the United States Patent and Trademark Office